March 15, 1927.

A. CICCONE 1,621,395

VALVE PAD FOR WIND INSTRUMENTS

Filed July 5, 1923

Inventor
Anthony Ciccone.
Milo B Stevens & Co
Attorney

Patented Mar. 15, 1927.

1,621,395

UNITED STATES PATENT OFFICE.

ANTHONY CICCONE, OF CHICAGO, ILLINOIS.

VALVE PAD FOR WIND INSTRUMENTS.

Application filed July 5, 1923. Serial No. 649,665.

My invention relates to saxophones and other wind instruments, and more particularly to valves for stopping the ports or openings thereof.

The valves of wind instruments comprise a support of cup like or other form having a prominent sustaining edge in the nature of a flange which forms a recess within which is usually disposed a padded filler having an exterior covering of finished leather such as kid or the like. The difficulty with valves constructed as above described is that in playing the instrument there is an attendant vibration of the covering material of the pad, and since this vibration is without resonance the tone of the notes produced is more or less harsh, the vibration of the pad covering robbing the tones of their mellow qualities. This is especially true after the pad covering has stretched and become more or less loosened. Such pads must necessarily be frequently replaced, and since they are usually glued within the support, replacement thereof is rendered more or less inconvenient. It is therefore the primary object of my invention to provide in connection with the recessed portion of a valve a novel and improved substitute for the padded disk or filler which will effectually serve to close a port or opening in the instrument but which will not detract from the normally round and mellow tone of the notes produced thereby.

Another important object of the invention is the provision of a valve pad which will be securely retained in place in its support without necessitating the use of adhesive substances.

The invention has for a further object the provision of a valve pad wherein the employment of a stretched membrane cover therefore is obviated, thus rendering frequent removal of the pads and replacing of the membrane unnecessary.

A still further object of the invention is to furnish a device of this character which is very simple in construction, convenient and highly efficient in use, and which will be inexpensive to manufacture.

With the above and other objects in view, which will be developed in the course of the detailed description appearing hereinafter, the invention comprises certain novel features of construction and arrangement of the various parts as will be better understood upon reference to the accompanying drawing forming a part of this specification.

Figure 1:
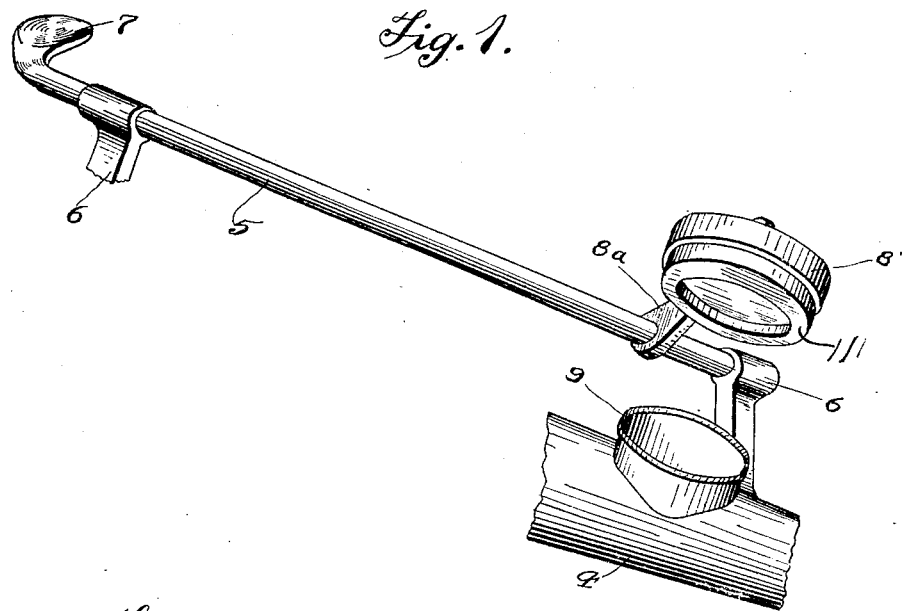
Figure 1 is a perspective view showing one of the ports of a saxophone, the valves thereof being supplied with a pad and filler constructed in accordance with my invention.

Referring specifically to the drawings, wherein like reference characters have been used to designate like parts throughout the views, numeral 4 denotes a portion of a saxophone which is provided with the usual bearings 6 for an operating arm 5 which carries intermediate its ends an arm $8^a$ supporting the standard cup like valve or stop portion 8 for closing a port 9 of the instrument. A finger piece or key 7 serves to actuate the valve to and from closed position.

So much of the instrument that has been described above is of standard design and no novelty is claimed therefor.

Figure 2:
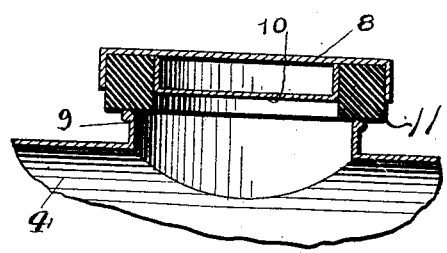
Fig. 2 is a cross section of the valve in seated position upon a port.

Coming now to the pad and filler for the valve, which form the subject matter of my invention, it will be noted upon reference to Fig. 2 that I have disposed within the valve 8 a metal filler 10 in the nature of a disk having a lateral circumferential flange which is directed towards and abuts against the back wall of the valve 8 to which it may be soldered or otherwise secured as may seem preferable. The flange of the filler 10 is circumferentially equidistant from the side wall of the valve 8 forming a circumferential recess for the reception of an angular ring like pad 11 of rubber, leather, felt or other suitable firm material which acts as a buffer to push against the rim of the port 9 when the valve is closed. It will be evident from the foregoing that the objectionable vibration of a membrane-covered pad closure for the valve is done away with, but at the same time a very efficient buffer or pad is formed. Repeated seating of the pad against the rim of the port 9 will serve upon each closing of the valve to more firmly seat the pad in the angular space between the filler flange and depending wall of the valve, this effect resulting from the more or less compressible material of which the pad 11 is formed.

Figure 3:
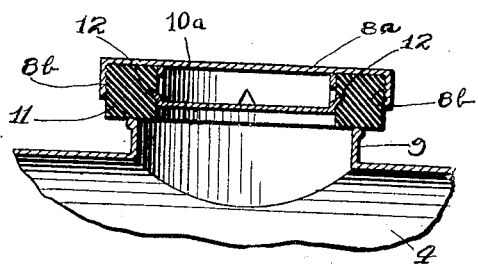
Fig. 3 is a similar view of a modified form of the invention.

In Fig. 3 a modified form of the invention is illustrated wherein a positive means is employed in connection with the valve filler for retaining the ring pad 11 in place. This modification embodies the interior serrations of the walls of the valve 8ª as shown at 8ᵇ and also the striking of a plurality of barbs 12 outwardly from the flange of the filler 10ª. Thus, upon insertion of the ring like pad 11 into the space between the flange and the wall of the valve, the serrations 8ᵇ and the barbs 12 will engage the opposite sides of the ring to effectually maintain the same in place. This is especially advantageous where a pad is used which is formed of relatively incompressible material. It might also be mentioned in this connection that in using a ring of rubber or other kindred substance, satisfactory results may be obtained without necessitating the soldering or otherwise securing the filler 10ª to the valve. The diameter of the filler in this application of the invention may be slightly greater than the diameter of the central opening of the ring pad 11. The filler will first be pressed into the ring from the rear face thereof until it is in proper position, after which the ring will be forced into the valve whereupon the pressure of the filler and the action of the serrations 8ᵇ will rigidly maintain the parts in assembled relation.

Figures 2 and 3 plainly illustrate that the compressible pad member extends beyond the inner and outer walls which hold the same in place so that the outer portion of the compressible pad is free for lateral or radial expansion. This provides for the increased life of the pad.

Also it will be seen that the forward end of the pad is entirely free so that any portion of the forward end of the pad may be seated. Thus in case of looseness or wear of the metal parts the compressible pad will still properly seat.

I claim:

1. A valve for wind musical instruments comprising a cup-shaped member having an annular wall, a filler within said cup-shaped member and having an annular wall inwardly of and in spaced parallel relation to said first wall thereby defining an annular channel, and a compressible annular pad member received in said channel and being extended beyond said walls whereby the forward portion of the same may be compressed laterally, the entire forward portion of said end surface of the pad being free whereby any portion of said surface may be seated.

2. A valve for wind musical instruments comprising a cup-shaped member having an annular wall, a filler within said cup-shaped member and having an annular wall inwardly of and in spaced parallel relation to said first wall thereby defining an annular channel, and a compressible annular pad member received in said channel and being extended beyond said walls whereby the forward portion of the same may be compressed laterally, the entire forward portion of said end surface of the pad being free whereby any portion of said surface may be seated, one of said walls being provided with serrations to engage said pad to hold the pad firmly in place.

3. The construction set forth in claim 2, the wall of said filler being provided with outwardly directed barbs adapted to be embedded in the inner side of said compressible pad.

In testimony whereof I affix my signature.

ANTHONY CICCONE.